(12) United States Patent
Petterson

(10) Patent No.: US 6,439,157 B1
(45) Date of Patent: Aug. 27, 2002

(54) DEVICE ARRANGED TO PERMIT AN AIR FLOW FROM AN ENVIRONMENT TO AN INNER SPACE

(75) Inventor: Torbjörn Karl Ingemar Petterson, Gnesta (SE)

(73) Assignee: Delaval Holding AB, Tumba (SE)

( * ) Notice: Subject to any disclaimer, the term of this patent is extended or adjusted under 35 U.S.C. 154(b) by 0 days.

(21) Appl. No.: 09/555,616

(22) PCT Filed: Dec. 4, 1996

(86) PCT No.: PCT/SE98/02226

§ 371 (c)(1),
(2), (4) Date: Jun. 1, 2000

(87) PCT Pub. No.: WO99/31968

PCT Pub. Date: Jul. 1, 1999

(30) Foreign Application Priority Data

May 12, 1997 (SE) ................................................ 9704548

(51) Int. Cl.[7] .................................................. A01J 5/04
(52) U.S. Cl. ...................................................... 119/14.47
(58) Field of Search .......................... 119/14.47, 14.54, 119/14.55; 137/205, 517, 844

(56) References Cited

U.S. PATENT DOCUMENTS

| 828,613 A | | 8/1906 | Lane | |
|---|---|---|---|---|
| 3,109,429 A | * | 11/1963 | Schwartz | |
| 3,476,085 A | | 11/1969 | Noorlander | |
| 3,739,983 A | * | 6/1973 | Jousson | 239/101 |
| 3,964,509 A | * | 6/1976 | Daubenberger et al. | 137/525.1 |
| 4,660,747 A | * | 4/1987 | Borg et al. | 222/213 |
| 4,938,259 A | * | 7/1990 | Schmidt | 137/517 |
| 4,946,133 A | * | 8/1990 | Johnson et al. | 251/149.1 |
| 5,076,211 A | | 12/1991 | Tonelli | |
| 6,085,769 A | * | 7/2000 | Poyner et al. | 137/844 |
| 6,092,551 A | * | 7/2000 | Bennett | 137/844 |

FOREIGN PATENT DOCUMENTS

| DE | 1063849 | 8/1959 |
|---|---|---|
| DK | 7657 | 6/1905 |
| NO | 83848 | 6/1954 |

* cited by examiner

Primary Examiner—Thomas Price
(74) Attorney, Agent, or Firm—Hovey Williams LLP

(57) ABSTRACT

The invention refers to a device (8) which is arranged to permit an air flow from an environment to an inner space (3) of a member (1). The device (8) comprises a passage through a wall section (2a) of said member (1). The wall section (2a) comprises a convex surface area (19) which faces said environment, wherein the passage extends through the surface area (19). In one application of the invention said member comprises a milking member (1).

18 Claims, 3 Drawing Sheets

DEVICE ARRANGED TO PERMIT AN AIR FLOW FROM AN ENVIRONMENT TO AN INNER SPACE

THE BACKGROUND OF THE INVENTION AND PRIOR ART

1. Field of the Invention

The present invention concerns a device arranged to permit an air flow from an environment to an inner space of a member, comprising a passage through a wall section of said member.

2. Description of the Prior Art

It is known to provide such air inlet devices in connection with milking members. For example U.S. Pat. No. 5,076,211 shows a teat cup claw with such an air inlet formed by a simple opening, which extends through a wall section of the teat cup claw. The object by such an air inlet is to create a flow through an inner space of the teat cup claw which inner space is connected to a vacuum pump in order to enable transportation of the milk, which is present in the inner space. At the same time, it is desirable to mix as little air as possible with the milk in order to be able to maintain a high quality of the latter. That means that the opening is to be made small, i.e. with a small diameter which usually may be between 0.5 and 1 mm.

However, such air inlets have the drawback that they often become filled up with dirt, muck, insect legs or dried milk. Since milk easily is accumulated in the area of the air inlet, it attracts flies and other insects. It thereby happens that a fly gets stuck with a leg in the air inlet opening, which results in that the opening will finally be completely closed.

In addition to the risk of being filled up, such relatively small openings are difficult and expensive to produce in for example a teat cup claw of steel but it is also difficult to make such a small opening in a teat cup claw of plastic, since the opening is very small in relation to the teat cup claw.

SUMMARY OF THE INVENTION

The object of the present invention is to achieve an air inlet which does not have the drawbacks mentioned above. In particular, an air inlet is aimed at which has a reduced tendency of being filled up. Furthermore, an air inlet is aimed at which is easy to clean.

This object is obtained by the device initially defined which is characterized in that the wall section comprises a convex surface area which faces said environment, wherein the passage extends through the surface area. Preferably, the convex surface area is designed with such a convexity that an accumulation of substances on the surface area is prevented. Consequently, such substances, such as dirt and other particles or liquids, for example milk, will not be accumulated in the area around the passage, since particles of dirt or liquids will "flow" over the convex surface away from the passage. Consequently, the convex surface area, with the passage, will not be so attractive for flies and other insects.

According to a preferred embodiment of the invention the passage extends through an essentially central part of the surface area. Furthermore, the surface area is advantageously continuously convex. By these embodiments, the production of the device according to the invention is facilitated.

According to a further embodiment of the invention the convex surface area extends upwards from the wall section. Thereby, it is facilitated in an even higher degree for particles of dirt and liquids to flow away from the passage. Furthermore, the passage and the convex surface area may by such a design be cleaned in a simple manner, by simply passing over the surface portion with a finger.

According to a further embodiment, the passage is defined by a wall portion and the passage is tapered in a direction from the inner space to said environment. By such a tapered, preferably conical, design of the passage, it is guarantied that possible dirt which penetrates the passage will be sucked into the inner space in a simple manner and in this way it is guarantied that the passage is always open.

According to a further embodiment of the invention, the device comprises an element comprising the convex surface area and being arranged to be provided in an aperture of said wall section. In this way, the convex surface area and the passage may constitute a small unit, which may be separately produced and which may be assembled with for example a teat cup claw or a teat cup. Advantageously, said element is arranged to be able to be pushed into and pulled out from said aperture. In this way, the element may in a simple manner be changed if it after all would have been filled up. This embodiment also makes it possible to change between passages with different dimensions for different occasions. Advantageously, said element is substantially tubular, wherein it may comprise an end portion with an outer surface which forms the convex surface area.

According to a further embodiment of the invention, a sealing member is provided between said element and said aperture. In this way, it is guarantied that no air may pass through between the element and the wall of the aperture. Advantageously, the sealing member may also be tubular and furthermore, it may comprise a flange, which extends substantially radially outwards and is arranged to abut said wall section. Advantageously, the sealing member is fixedly provided at said element. The sealing member may thereby be made of a rubber-like material, which is melted together with said element. The element may thereby be made of a thermoplastic resin, which comprises sulphur.

In a preferred application of the invention, said member comprises a component of a milking plant. This component may comprise a milking member, such as a teat cup claw or a teat cup.

BRIEF DESCRIPTION OF THE DRAWINGS

The present invention will now be described more closely by means of different embodiments and with reference to the attached drawings.

DETAILED DESCRIPTION OF DIFFERENT EMBODIMENTS OF THE INVENTION

The invention is now to be shown in different embodiments where the device according to the invention has been applied to different milking members.

Figure 1:
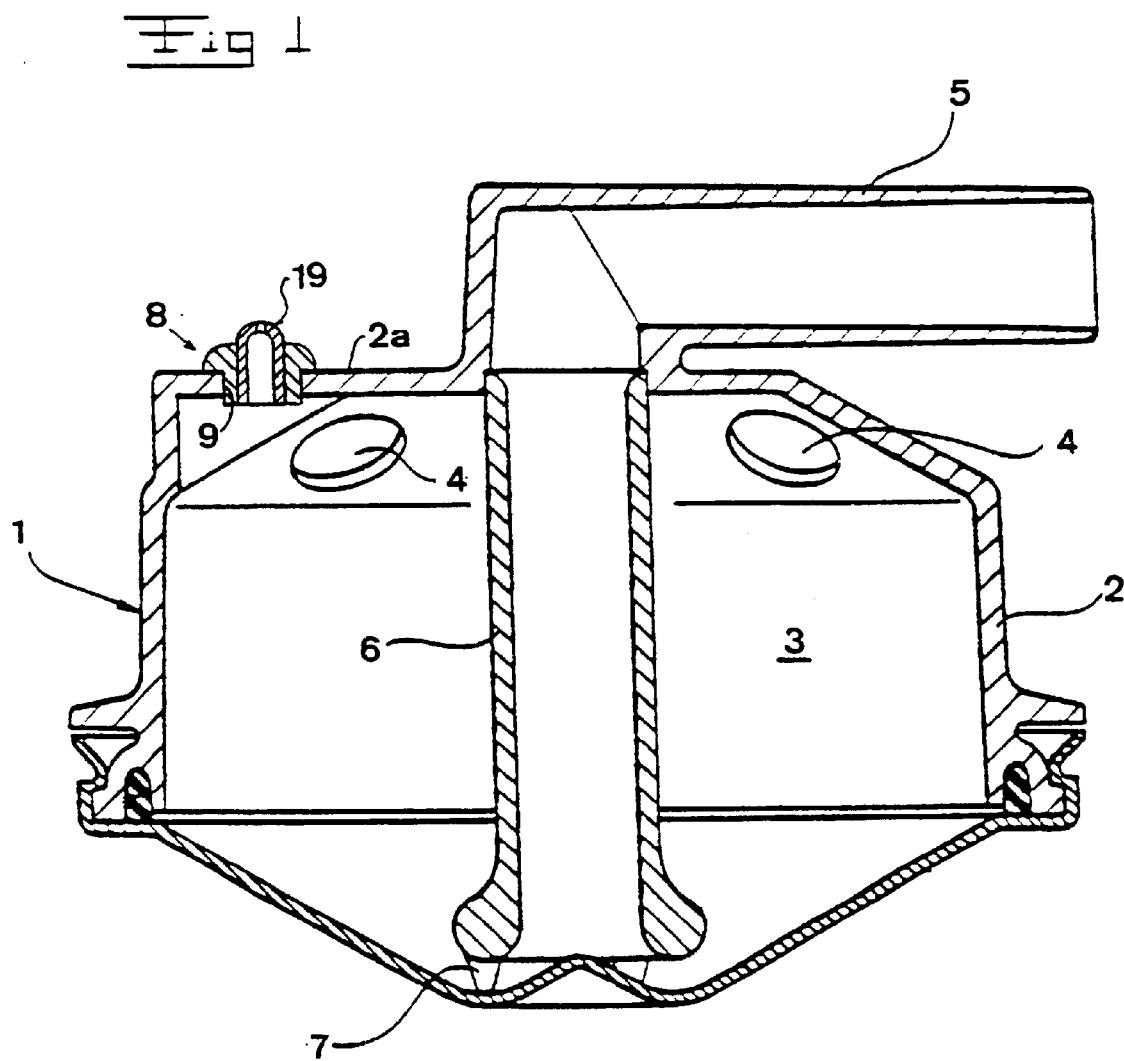
FIG. 1 shows a teat cup claw with a device according to the invention.

FIG. 1 shows a vertical cross-sectional view through a teat cup claw 1, which comprises a casing or a wall 2, which encloses an inner space 3. in an upper portion of the wall there are four inlet openings 4, of which two are shown in FIG. 1 and each of which is arranged to receive a short milk duct, which extends to a teat cup (not shown). Consequently, the teat cup claw 1 is arranged to receive the milk, which is produced in connection with milking, through the inlet openings 4. Furthermore, the teat cup claw 1 comprises an outlet tube 5, which via a long milk duct (not shown) is connected to a vacuum pump of a milking machine. Consequently, the milk, which is accumulated in the inner space 3 of the teat cup claw 1, is sucked out of the latter through the outlet tube 5 via a suction tube 6, which rests on the bottom of the teat cup claw by means of spacing members 7.

In order to create a flow through the teat cup claw and to enable the transportation of milk therefrom, an air inlet device 8 according to the present invention is provided in an aperture 9 in a wall section 2a of the wall 2. During a milking operation, air will pass from the environment through the air inlet device 8 into the inner space 3 of the teat cup claw 1 and force the milk therefrom via the suction tube 6 and out from the teat cup claw through the outlet tube 5.

Figure 2:
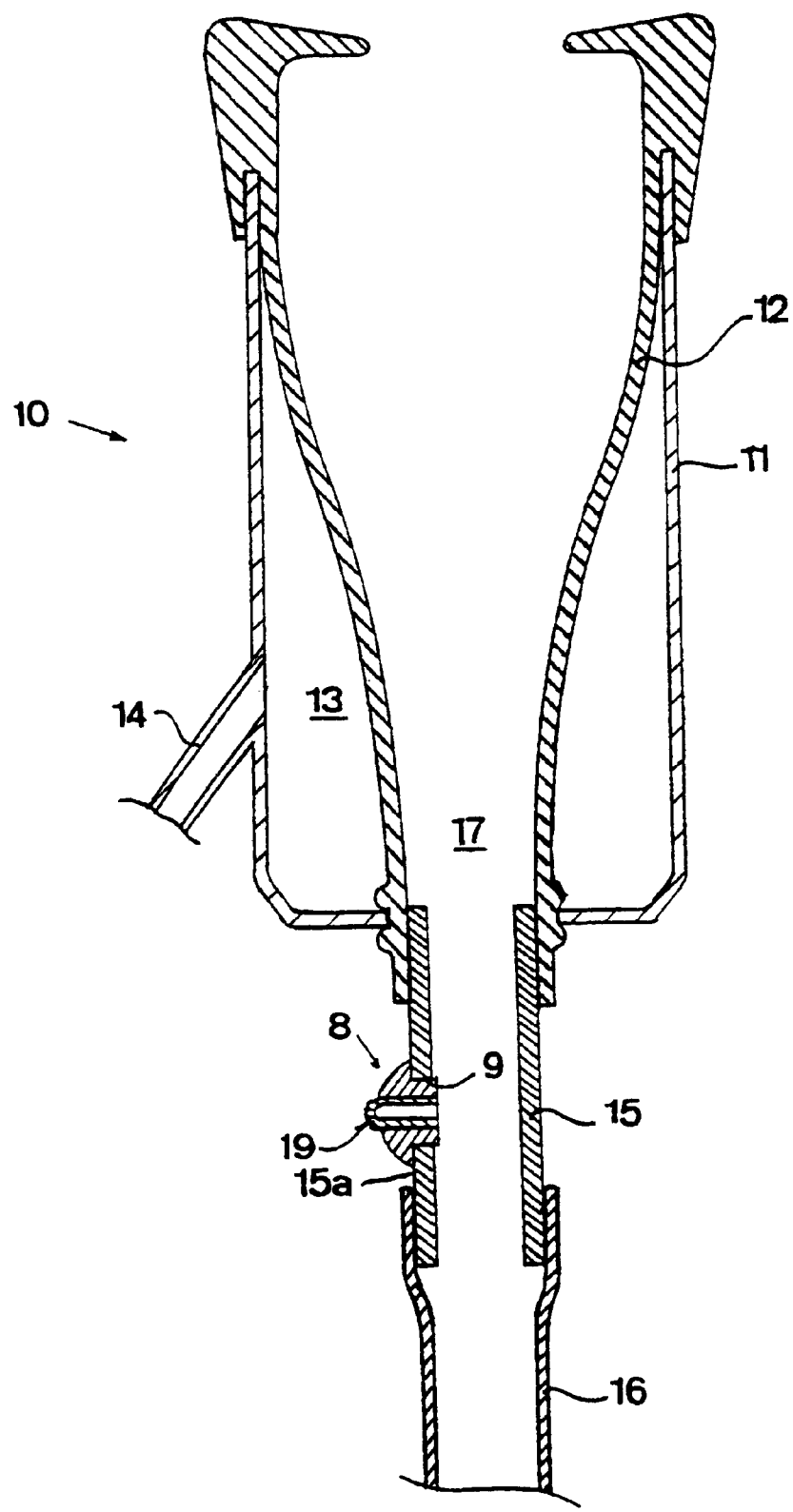
FIG. 2 shows a teat cup with a device according to the invention.

FIG. 2 shows a teat cup 10 with a casing 11 in which a teat rubber 12 is provided. Between the casing 11 and the teat rubber 12 there is a pulsation chamber 13, which via a pulsation conduit 14, is supplied with a cyclically alternating pressure level in such a way that the teat rubber 12 will pulsate. In a lower end, the teat rubber 12 is connected to a tube sleeve 15, which in turn is connected to a milking tube 16 for the transportation of milk from an inner space 17 of the teat cup 10.

In the same way as in the first embodiment, an air inlet device 8 is provided in an aperture 9 in a wall section 15a of the tube sleeve 15 also in this case in order to create a flow through the teat cup 10 and to enable the transportation of milk therefrom.

Figure 3:
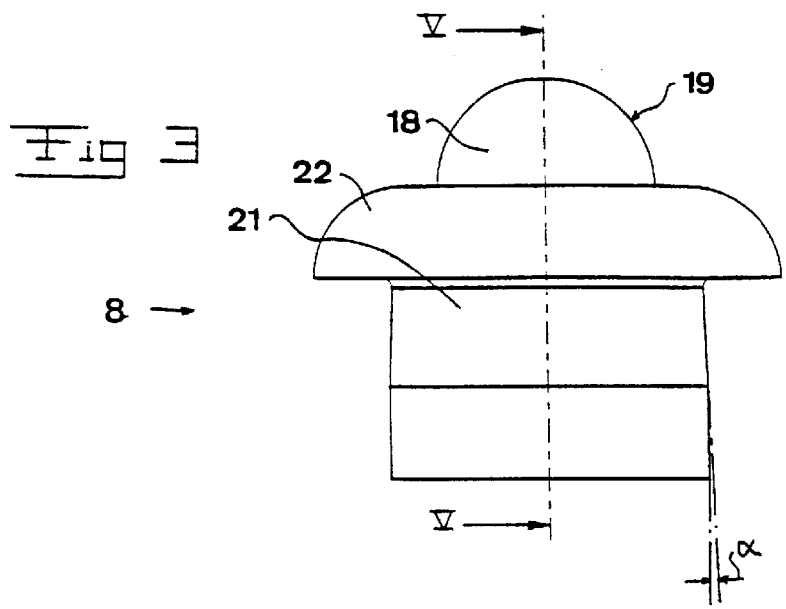
FIG. 3 shows a side view of the device according to the invention.
Figure 4:
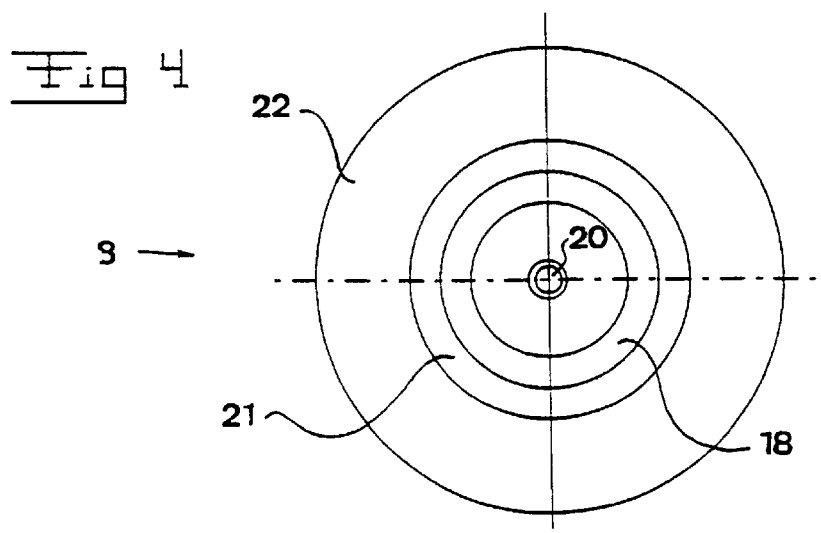
FIG. 4 shows a view from below of the device according to the invention.
Figure 5:
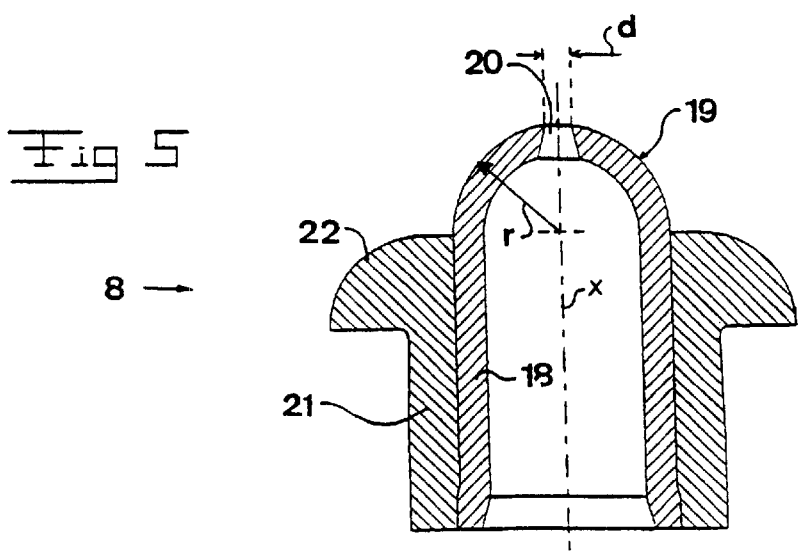
FIG. 5 shows a cross-sectional view of the device along the line V—V in FIG. 3.

The air inlet device 8 according to the invention is now to be more closely explained with reference to FIGS. 3–5. The air inlet device 8 comprises a tubular element 18, which in one of its ends comprises a dome-shaped end portion with a convex outer surface 19. The convex outer surface 19 has a relatively strong convexity so that particles and milk will not stay on the surface 19 and is advantageously continuously convex, i.e. has no sharp edges and/or plane portions and may for example be spherical. The surface 19 may thereby have a radius of curvature r, which is between 1–5 mm, preferably 2–4 mm, for example about 3 mm. The tubular element 18 extends along a longitudinal central axis x and comprises a passage 20 which extends through the dome-shaped end portion and which is substantially concentric with regard to the longitudinal central axis x. The passage 20 which is defined by wall portion is furthermore substantially conically tapered in an outward direction towards the convex outer surface 19 and the environment. The passage 20 has in its most narrow end, i.e. at the convex outer surface 19, a diameter d which may be between 0.5 and 1 mm, preferably between 0.6 and 0.8 mm. Furthermore, the device comprises a sealing member 21, which also is tubular and which is arranged to receive the tubular element 18. Furthermore, the sealing member 21 comprises a flange or collar 22, which is provided in one end of the sealing member 21 and which extends substantially radially outwards. As is shown in FIGS. 3 and 5, the tubular element 18 is provided in the sealing member 21 in such a way that the dome-shaped end portion extends upwardly and past the flange 22. The flange 22 is on its upper side, i.e. at the end surface of the sealing member 21, convex shaped.

Both the sealing member 21 and the tubular element 18 may be produced by an injection moulding process. The sealing member 21 is preferably made of a rubber-like material and the tubular element 18 may advantageously be made of a thermoplastic resin, which comprises sulphur, for example polysulfhone. It is thereby possible to achieve a fixed connection between the sealing member 22 and the tubular element 18 by melting them together with each other, preferably by a vulcanizing process.

As is shown in FIGS. 1 and 2, the device 7 is arranged to be pushed into the aperture 9 in the teat cup claw 1 and the tube sleeve 15 of the teat cup 10, respectively. The sealing member 21 will thereby seal against the wall of the aperture 9 and the flanged 22 will abut the wall section which encloses the aperture 9. In order to improve the fixation of the device 7 in the teat cup claw 1 and the tube sleeve 15, respectively, at least one part 23 of the cylindrical outer surface of the sealing member 21 may be slightly conically tapered in the direction towards the flange 22 with a cone angle α, which may be about 1–3°. Furthermore, as is shown in FIGS. 1 and 2, both the flange 22 and the convex outer surface extend higher than the surrounding outer surface of the wall section 2a and 15a, respectively.

The invention is not limited to the embodiments shown but can be varied and modified within the scope of the following patent claims.

What is claimed is:

1. A device arranged to permit an air flow from an environment to an inner space of a member, having a wall section presenting a surface area comprising a passage through the wall section of said member wherein the wall section comprises a convex surface area which faces said environment, and wherein the passage extends through the surface area, wherein the passage is defined by a wall portion and is tapered in a direction from the inner space to said environment, and wherein said member comprises a component of a milking plant.

2. A device according to claim 1, wherein the passage extends through an essentially central part of the surface area.

3. A device according to claim 2, wherein the surface area is continuously convex.

4. A device according to claim 3, wherein the convex surface area extends upwards from the wall section.

5. A device according to claim 1, wherein the passage is substantially conically tapered in an outward direction from the inner space to said environment.

6. A device according to claim 5, including an aperture of said wall section and an element comprising the convex surface area and being arranged to be provided in the aperture of said wall section.

7. A device according to claim 6, wherein said element is arranged to be able to be pushed into and pulled out from said aperture.

8. A device according to claim 6, wherein said element is substantially tubular.

9. A device according to claim 8, wherein the tubular element comprises an end portion with an outer surface which forms the convex surface area.

10. A device according to claim 9, including a sealing member which is provided between said element and said aperture.

11. A device according to claim 10, wherein the sealing member is tubular and comprises a flange which extends substantially radially outwards and is arranged to abut said wall section.

12. A device according to claim 10, wherein the sealing member is fixedly provided at said element.

13. A device according to claim 12, wherein the sealing member is made of a rubber-like material, which is melted together with said element.

14. A device according to claim 13, wherein said element is made of a thermoplastic resin comprising sulphur.

15. A device according to claim 1, wherein said component comprises a milking member.

16. A device according to claim 1, wherein the surface area is continuously convex and including an aperture in said wall section and an element comprising the convex surface area positioned in said aperture.

17. A device according to claim 16, including a sealing member which is provided between said element and said aperture.

18. A device according to claim 17, wherein the sealing member is tubular and comprises a flange which extends substantially radially outwards and is arranged to abut said wall section.

* * * * *

UNITED STATES PATENT AND TRADEMARK OFFICE
CERTIFICATE OF CORRECTION

PATENT NO. : 6,439,157 B1
DATED : August 27, 2002
INVENTOR(S) : Petterson, Torbjorn Karl Ingemar It is certified that error appears in the above-identified patent and that said Letters Patent is hereby corrected as shown below:

<u>Title page,</u>
Item [22], after "December 4," please delete "1996" and insert -- 1998. --

Signed and Sealed this

Fourteenth Day of January, 2003

JAMES E. ROGAN
*Director of the United States Patent and Trademark Office*